July 26, 1966
H. J. GOONAN
3,263,058
WAVEGUIDE ALIGNER
Filed July 5, 1963
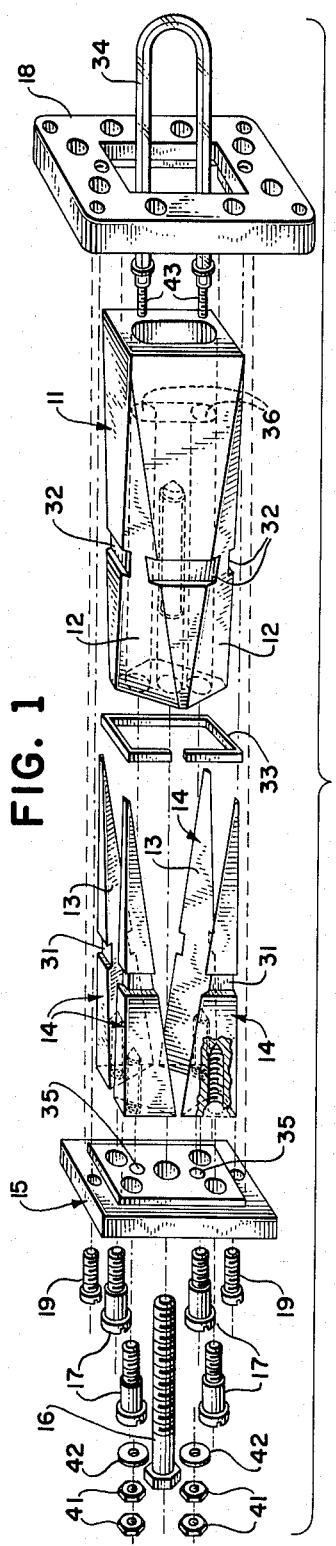
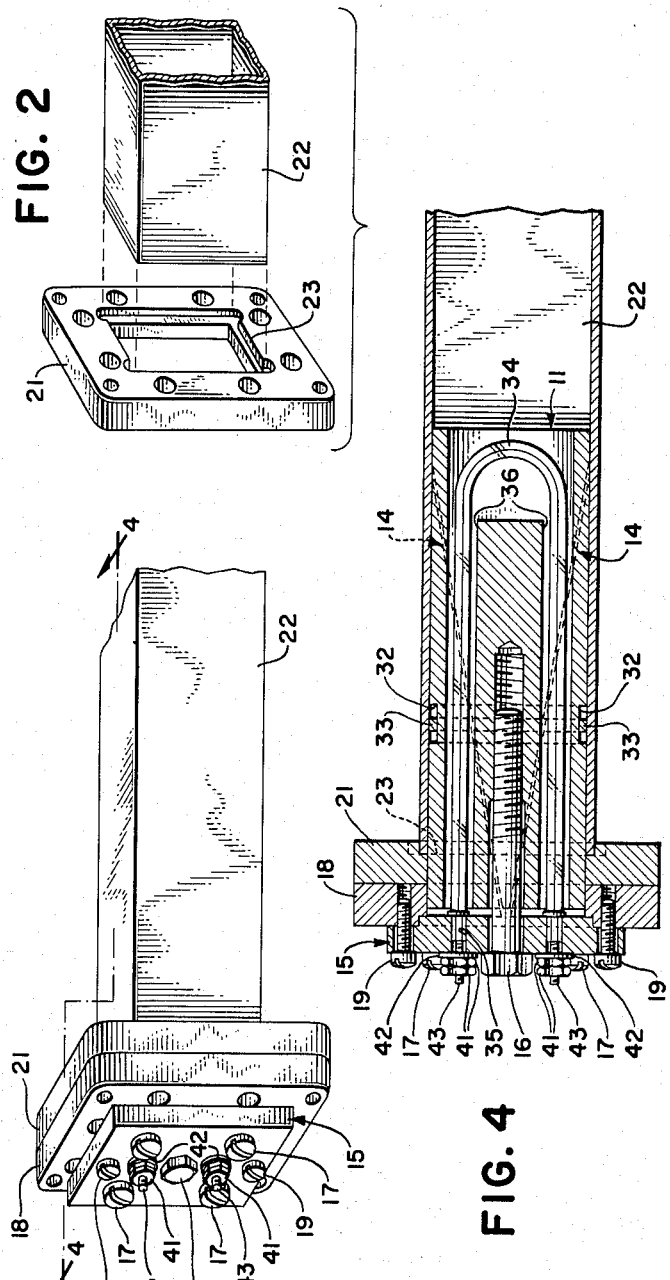
INVENTOR.
HARRY J. GOONAN
BY *Robert H. Henderson*
ATTORNEY 3,263,058
WAVEGUIDE ALIGNER
Harry J. Goonan, Brooklyn, N.Y., assignor to The Western Union Telegraph Company, New York, N.Y., a corporation of New York
Filed July 5, 1963, Ser. No. 292,821
3 Claims. (Cl. 219—85)

This invention relates to microwave waveguides, and more particularly to a novel device for the placement and securing of a length of waveguide into its terminating connecting member.

Waveguides of rectangular section are commonly provided in stock or shorter lengths, which are connected in line by bolting together a pair of flanged fittings which are soldered on the abutting ends of adjacent waveguide sections.

Because of the existence of slight deviations in waveguide size and shape as a result of manufacturing tolerances, it is not to be expected, and it seldom occurs, that a smooth interior surface free of electrical discontinuities will result from such mere soldering and bolting operations. Irregularities sufficient to result in the production of a small but definite standing wave ratio at each such joint ordinarily occur. When it is remembered that the effect of such irregularities in producing distortion are proportional to the fourth power of the standing wave ratio, and that the effect of multiple joints, such as are found in the long waveguide runs necessitated by modern high gain antennas, are cumulative, it will be apparent that even small improvements in joint alignment and fit are warranted by the magnified improvement in system performance which results therefrom.

It is further found that although it is convenient to prepare some waveguides with flanges attached thereto in the shop, it is nearly always necessary to solder some of the flanges into place at the field location where the microwave installation often is to be erected. Under these circumstances, when waveguide of the size adapted for common carrier use or larger is involved, such soldering in the field is attended with several disadvantages. Retaining the flange in precise location on a vertical waveguide is difficult, though absolutely essential. Achieving an adequate soldering temperature uniformly throughout the joint in order to avoid discontinuities in the solder seal is not easy to accomplish with field equipment such as torches, and discoloration or weakening due to local overheating can be avoided only by a high degree of skill and extreme care.

By means of the present invention, it is possible to ameliorate these difficulties, so that even the relatively unskilled can construct an electrically superior joint with certainty, convenience, and despatch in any location.

The present invention is unique in that because of the details of its structure as hereafter described, it is feasible to locate an electrical heating element within the device such that soldering temperature may be achieved without the application of external heat. This result has not been obtained heretofore, and is especially advantageous because of the elimination of variable thermal coupling which always exists between an external source of heat such as a torch, or even an electric hot plate as used in the most advanced alternative, and the guide-and-joint assembly. As a consequence of this, it is now possible to program the heating of a joint to soldering temperature by applying a measured quantity of electrical energy to the heater such as a predetermined current in the heater element maintained for a measured period of time such that assurance of reaching but not exceeding an optimum soldering range of temperatures may be had.

From this advantage is derived directly the less obvious one that because of the accurate temperature control thus made possible, waveguide rubber gasketed joints for wave guide pressurization may now be employed without danger of damaging the fixedly mounted gasket by overheating.

As a structure having symmetry in two transverse axes, the present invention is suitable also for use as a machine tool jig for retention of waveguide portions during machining operations, as its predecessors were not. This is also due to the fact that the instant invention has a locating flange as an integral part thereof, by means of which the wave guide section may be definitely located in the metal working machine.

It is therefore an object of the invention to provide means for reducing the standing wave ratio of a waveguide joint.

It is another object of the invention, to provide such means wherein waveguide material of broadened size tolerance can be used without sacrifice of electrical characteristics.

It is still another object of the invention to provide convenient means for soldering a flange onto a vertical run of waveguide.

Still another object is to provide means for heating a waveguide joint assembly to uniform soldering temperature without local overheating.

The manner of attaining these objects as well as certain advantages will become apparent from the following detailed description of a specific illustrative example of the best method of practicing the invention, when taken together with the drawings, wherein:

FIG. 1 is an exploded perspective view of the instant invention;

FIG. 2 is a perspective view of a waveguide and flange to be joined by the instant invention;

FIG. 3 is a view of the instant invention in place on a waveguide and flange; and FIG. 4 is a sectional view of FIG. 3.

Turning now to the drawings, wherein like numbers refer to the same parts in all figures, there is seen a plug 11 which, like the remainder of the device to be described, may be made of metal having a melting point higher than that of solder, and to which solder does not stick, such as chromium plated brass. Surfaces such as 12 on the plug 11 are tapered to interfit with the surfaces such as 13 on the tetrahedric parts 14 so as to produce, when so engaged, essentially a right rectangular prism of dimensions equalling or slightly exceeding the maximum expected internal dimensions of any waveguide of a given nominal size, to be flanged.

The plug 11 and the parts 14 will abutt, when so expanded by interfitting, the plate 15 against which they are drawn by the screw 16. The shoulder screws 17 retain parts 14 releasably in position.

Shoulder screws are employed which make up solidly against their shoulders on the part 14 without tightening under their heads on the part 15. In addition, they are a loose fit in the holes of part 15. As a consequence of this, the parts 13 and 14 can not be rigidly fastened in place on the part 15 by screws 17, but can only be fixed loosely in approximate position, so that their exact position is determined only by the portions 12 of plug 11, which constitute guiding and control surfaces to force them in position in the guide 22.

Grooves 31 in the parts 14 and 32 in the plug 11 align upon assembly and retain the snap ring 33 which also is effective to retain the parts of the assembly loosely in place, even if some of screws 16 or 17 may be removed inadvertently. Said grooves and snap ring are alone sufficient adequately to secure the assembly in position without the aid of shoulder screws 17, but is found in practice that said screws comprise a distinct convenience in the removal of the invention from the completed joint, since the screw 16 need only be loosened part way and struck sharply with a hammer in order to disengage the device from its very tight fit in the guide.

An electrical heating element 34 of the familiar enclosed coil type is secured in place on part 15 through holes such as 35 therein by nuts such as 41 over insulating washers 42 engaging its terminal posts 43 and is sufficiently loose in the holes 36 of plug 11 to allow free motion of said plug in the axial direction over the necessary small fraction of an inch required for its operation. It will be observed that since said heating element 34 is substantially fully enclosed within a metallic block, it becomes a relatively simple matter to calculate or to determine by experiment the exact quantity of electrical energy necessary to be expended in the coil in order to raise the temperature of the assembly to a desired soldering temperature.

A collar 18 is secured to the plate 15 by means of screws 19 and receives pressed against it the waveguide flange 21 into which waveguide 22 is inserted in the recess 23 in flange 21.

Although the instant invention has been described in terms of a specific illustrative example of the best known mode of practicing the same, it will be understood that various modifications or elaborations thereof will occur to those skilled in the art which do not, however, depart from the essential spirit of the invention, and it therefore is intended that the invention shall be limited only by the appended claims.

What is claimed is:

1. Rectangular waveguide flanging means composed of materials having relatively high surface tension with respect to molten solder and comprising waveguide flange aligning plate means, symmetrically expandable waveguide gripping plug means secured thereto and comprising four pyramidal corner element means loosely affixed to the said plate, tapered central spreading means for the said element means located therebetween and tightenable onto said plate for corner element means expansion, and heater means for applying a predetermined quantity of heat to said flanging means to raise its temperature to a predetermined desired soldering temperature.

2. Flanging means for hollow prismatic waveguide comprising an end plate for flange alignment, a tapered internal corner member for each corner of said waveguide loosely affixed to said end plate, tapered plug means within said corner members adapted to slide therebetween for forcing said corner members outwardly into waveguide contact and lateral stretching, screw means for advancing said plug means toward said end plate, and electric heater means in said plug means.

3. Flanging means for metallic waveguide having a plurality of internal corners which comprises a like plurality of uniformly tapered elongated corner engaging means, mounting plate means loosely affixed to said corner engaging means and transversely disposed in respect thereto to provide abutment for a waveguide flange, wedge means within said plurality of corner engagement means for the spreading thereof upon wedge means tightening, means to tighten the said wedge means, and an electrical heating element in said wedge means, whereby the mounting plate means transversely aligns a waveguide flange while the plurality of corner engaging means grip and expand a waveguide within said flange when the wedge means is tightened toward the mounting plate means, and soldering temperature of the thus assembled flange is attained by releasing a predetermined quantity of electrical energy into the heating element.

References Cited by the Examiner
UNITED STATES PATENTS

| | | | |
|---|---|---|---|
| 1,381,647 | 6/1921 | Knoll | 219—60 X |
| 2,080,906 | 5/1937 | Boyer | 269—48.1 |
| 2,767,676 | 10/1956 | Johnson et al. | 269—48.1 |
| 2,767,677 | 10/1956 | Johnson et al. | 269—48.1 |
| 3,009,048 | 11/1961 | Stanley | 219—60 |
| 3,031,995 | 5/1962 | Taylor | 269—48.1 |

RICHARD M. WOOD, *Primary Examiner.*

B. A. STEIN, *Assistant Examiner.*